US010805077B2

(12) United States Patent
Mullins et al.

(10) Patent No.: US 10,805,077 B2
(45) Date of Patent: *Oct. 13, 2020

(54) PARTIALLY ENCRYPTED CONVERSATIONS VIA KEYS ON MEMBER CHANGE

(71) Applicant: Microsoft Technology Licensing, LLC, Redmond, WA (US)

(72) Inventors: Christopher L. Mullins, Redmond, WA (US); Robert Standefer, III, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,005

(22) Filed: May 21, 2019

(65) Prior Publication Data

US 2019/0273611 A1 Sep. 5, 2019

Related U.S. Application Data

(63) Continuation of application No. 15/400,574, filed on Jan. 6, 2017, now Pat. No. 10,341,100.

(51) Int. Cl.
*H04L 9/14* (2006.01)
*H04L 9/08* (2006.01)
*H04L 29/06* (2006.01)

(52) U.S. Cl.
CPC .......... *H04L 9/0891* (2013.01); *H04L 9/0833* (2013.01); *H04L 9/0861* (2013.01); *H04L 9/14* (2013.01); *H04L 63/045* (2013.01)

(58) Field of Classification Search
CPC ....... H04L 9/0891; H04L 9/14; H04L 9/0861; H04L 9/0833; H04L 63/045
See application file for complete search history.

(56) References Cited

U.S. PATENT DOCUMENTS

| 9,379,889 B2 * | 6/2016 | Bernsen | ................ H04L 9/0833 |
| 9,432,340 B1 * | 8/2016 | Tutt | ...................... H04L 9/3247 |
| 2010/0316219 A1 * | 12/2010 | Boubion | ................ G02B 21/16 380/259 |
| 2014/0269258 A1 * | 9/2014 | Bischoff | ................ H04L 45/28 370/221 |

(Continued)

*Primary Examiner* — Khoi V Le

(57) ABSTRACT

Examples of the present disclosure describe systems and methods for partially encrypting conversations using different cryptographic keys. Messages communicated during a conversation session may be encrypted using a cryptographic key. Other conversation participants may then decrypt the messages using the cryptographic key. During the conversation, an event may occur that causes a new cryptographic key to be generated. The conversation participants may then use the new cryptographic key when communicating. As such, previously-encrypted messages may be inaccessible to new members that do not have the old cryptographic key, while newly-encrypted messages may be inaccessible to former members that do not have the new cryptographic key. An isolated collection may store the messages and related cryptographic keys. Relationships may exist within the isolated collection, such that messages may be related to one another and messages may also be related to the cryptographic keys used to encrypt them.

20 Claims, 14 Drawing Sheets

(56) References Cited

U.S. PATENT DOCUMENTS

2015/0264042 A1* 9/2015 Lord .................. H04L 63/0823
                                                    726/10
2015/0312260 A1* 10/2015 Kim ....................... H04L 51/32
                                                    713/152

* cited by examiner

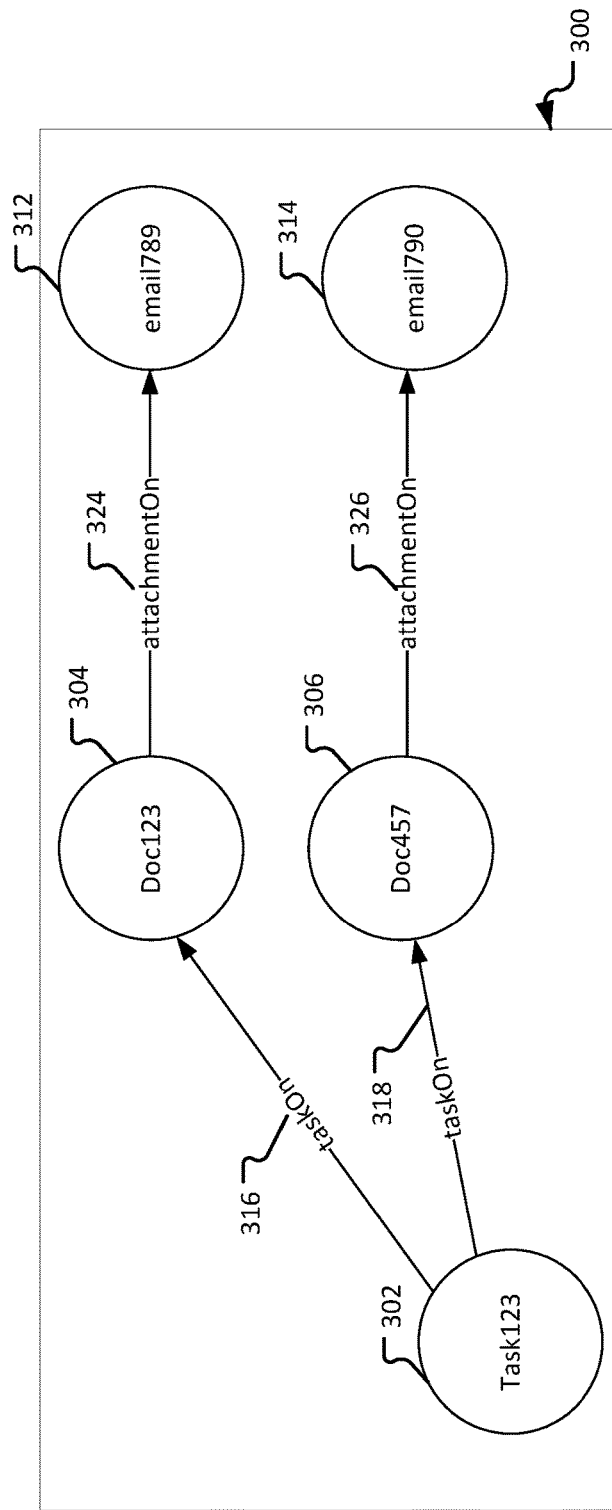
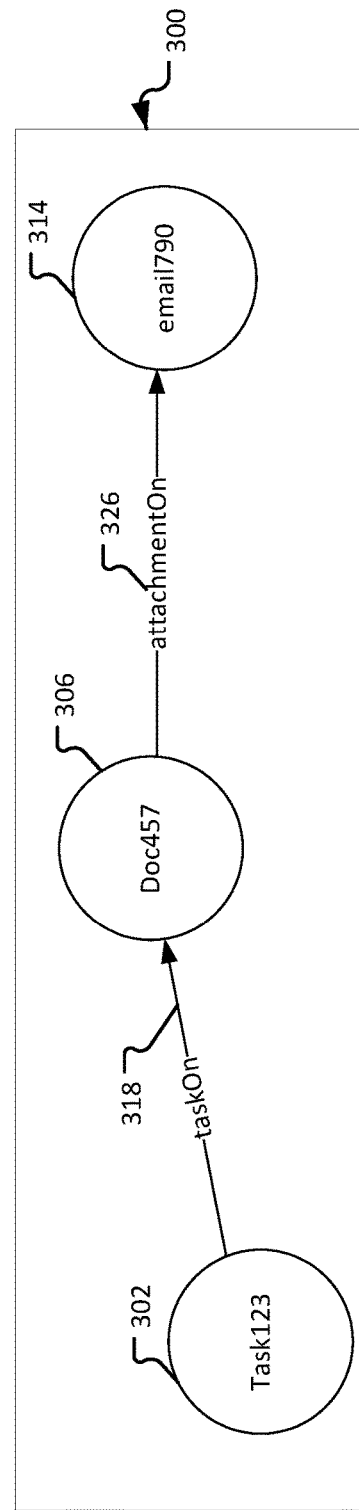

PARTIALLY ENCRYPTED CONVERSATIONS VIA KEYS ON MEMBER CHANGE

CROSS-REFERENCE TO RELATED APPLICATIONS

This application is a continuation application of U.S. patent application Ser. No. 15/400,574 (now U.S. Pat. No. 10,341,100), titled "PARTIALLY ENCRYPTED CONVERSATIONS VIA KEYS ON MEMBER CHANGE," filed on Jan. 6, 2017, the entire disclosure of which is hereby incorporated herein by reference.

BACKGROUND

Group conversations enable multiple people to converse and share ideas with flexibility and convenience. During a conversation session, participants of a conversation may enter and exit the conversation session. In some examples, new participants may be unable to see messages that were sent prior to their entrance and, similarly, former participants may be unable to see messages that have been sent after their exit. Traditionally, this has been as a result of the fact that the conversation messages were transmitted to the participants that were present at the time of transmission, without being further stored or retained after the conversation session. However, in a scenario in which conversation messages are durable (rather than ephemeral), conversation messages must be stored in such a way as to provide similar secrecy and security.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for partially encrypting conversations using different cryptographic keys on member change. In an example, a cryptographic key may be generated when a conversation is initiated. Messages that are sent during the conversation session may then be encrypted using the cryptographic key. The cryptographic key may be stored or be otherwise accessible by the conversation participants, such that the conversation participants may use the cryptographic key to encrypt and decrypt messages during the conversation session. At some point during the conversation, an event may occur (e.g., a change in conversation membership, a period of time may elapse, etc.). As a result of the event, a new cryptographic key may be generated and provided to the conversation participants. The conversation participants may then use the new cryptographic key when sending and receiving encrypted messages. As such, previously-encrypted messages may be inaccessible to new members who do not have the old cryptographic key. Similarly, newly-encrypted messages may be inaccessible to former members who left the conversation and therefore do not have the new cryptographic key.

Messages that are sent during the conversation session may be stored in an isolated collection. In an example, each message may be associated with a resource identifier, wherein the message may be stored in a data store and the resource identifier associated with the message may be stored in the isolated collection. In some examples, the cryptographic keys used to encrypt conversation messages may be stored in a key vault. In order to facilitate searching and retrieval, keys may be indexed within the key vault using key identifiers. The cryptographic keys or key identifiers may be stored in the same isolated collection as is used to store the conversation messages. Relationships may exist among the resources (e.g., among the messages and cryptographic keys) stored by the isolated collection. As an example, messages may be related to one another and each message may also be related to the cryptographic key that was used to encrypt it. As a result, it may be possible to determine which cryptographic key is required to decrypt a message and, conversely, which messages may be decrypted using a specific cryptographic key.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 3B-3E illustrate an example query model that may be used to traverse an isolated collection.

DETAILED DESCRIPTION

Figure 1:
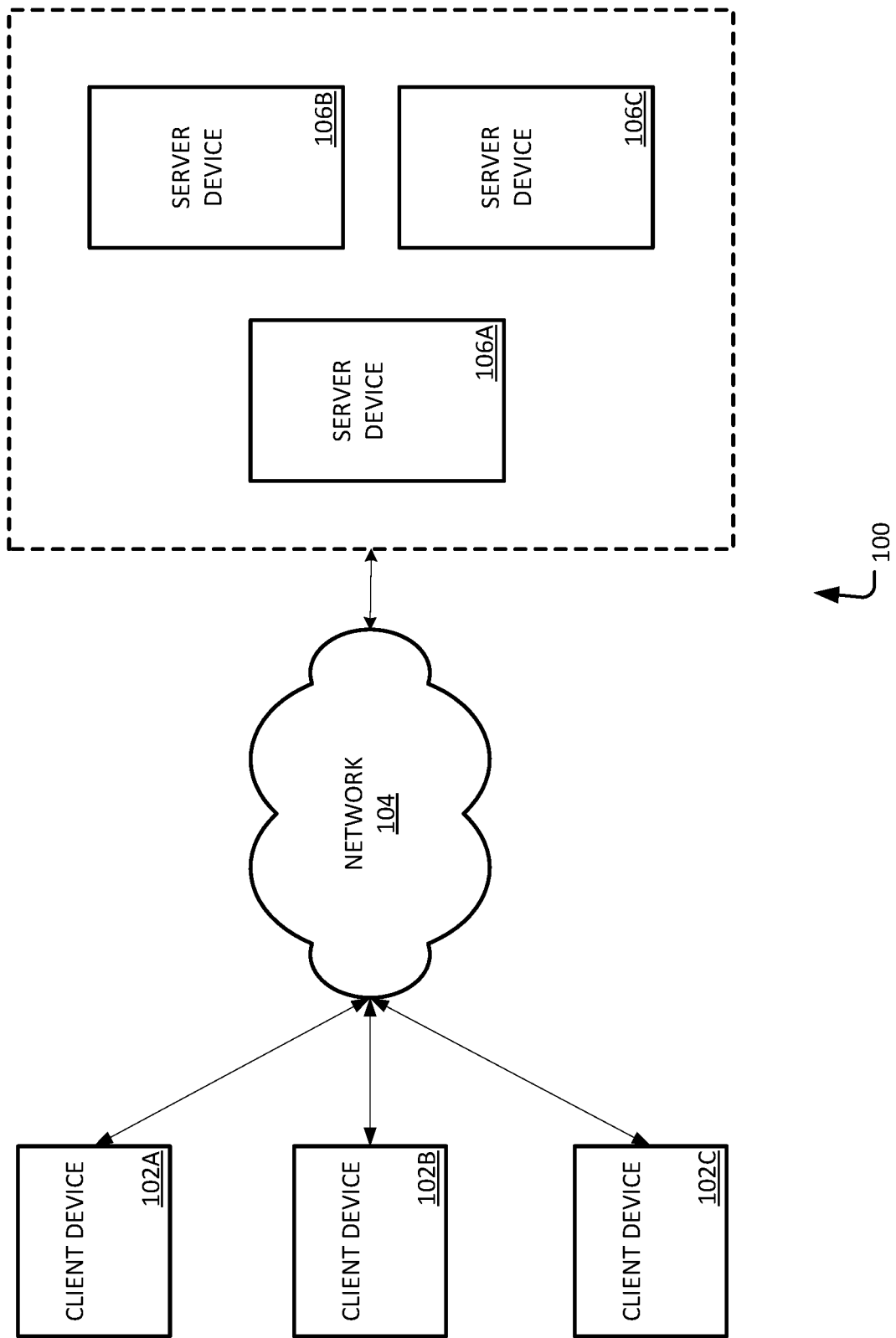
FIG. 1 illustrates an overview of an example system for partially encrypting conversations.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods for partially encrypting a conversation using different keys based on conversation membership. A conversation may be comprised of one or more messages. In some examples, each message may be a resource. A resource may be identified by a resource identifier, which may be a durable Uniform Resource Identifier (URI) pointing to the particular resource. The resource identifier may also be a uniform resource locator (URL), uniform resource name (URN), or other suitable identifier or pointers pointing to the resource itself. In one example, the resource may be stored within an isolated collection. In another example, the resource may be stored in a data collection, while an associated resource identifier may be stored in an isolated collection. For example, the resource may reside on a remote server, and the resource identifier may be used to retrieve the resource (e.g., the resource may be stored on a remote web server, where the resource identifier comprises a URL). Identifying the location of a resource may include parsing the resource identifier using, for example, regular expressions, providing one or more portions of the resource identifier to a search utility, executing the resource identifier, etc. Relationships within the isolated collection identify a correlation between two or more resources in the isolated collection. For instance, a first resource (e.g., a first message) may be a reply to a second resource (e.g., a second message). In such an example, the relationship between the first message and the second message may be "replyTo" or other similar identifying text representing the relationship between the two resources.

The resources, or resource indicators, and/or relationships may be provided by a developer or other external source. Such resources, resources indicators, and relationships are referred to herein as asserted resources, asserted resource indicators, and asserted relationships. Each isolated collection may also be enriched to create additional relationships and in some examples additional resource indicators, by executing a ruleset against the data already in the isolated collection. The additional data generated through execution of such a ruleset is referred to herein as inferred data, such as inferred relationships, inferred resources, and inferred resource identifiers. Queries may then be executed against the isolated collection that includes both the asserted data and inferred data to provide richer results than would otherwise be available solely from the asserted data alone. The isolated collection may also be stored as graph database, and results to queries of the isolated collection may be displayed in a graphical format wherein resources are displayed as nodes and the relationships are displayed as edges. As used herein, an isolated collection of resource identifiers and the relationships between those resources or resource identifiers may be referred as a "Set." Further, access to the isolated collection may be controlled through various techniques to provide additional security measures for the content in each isolated collection, and each isolated collection may have different rule sets to generate unique and different inferred data to meet the particular needs of each application.

One or more isolated collections may be used to store a conversation. For example, each conversation message may be a resource that is associated with a resource identifier, and each resource identifier may be stored within an isolated collection. In one example, one isolated collection may be used to store all of the messages associated with a conversation, or the messages may be stored using multiple isolated collections (e.g., based on conversation membership, the sender or recipient associated with a message, temporal criteria, conversation topic, etc.). In another example, the conversation may be divided among the multiple isolated collections or at least a subpart of the conversation may be duplicated among the multiple isolated collections.

A message may be encrypted using a cryptographic key such that the message may only be decrypted if the appropriate cryptographic key is accessible. In some examples, different messages within a conversation may be encrypted using different cryptographic keys. A cryptographic key may be a symmetric key or an asymmetric key pair comprised of a public key and a private key, among other cryptographic key types. A variety of cryptographic algorithms may be used, including, but not limited to, Advanced Encryption Standard (AES), Data Encryption Standard (DES), Rivest-Shamir-Adleman (RSA), and Elliptic Curve Cryptography (ECC), among others. Each cryptographic key may have similar or different properties as compared to other cryptographic keys in the plurality of cryptographic keys. As an example, each key may have similar or different key lengths or may use similar or different cryptographic algorithms. One of skill in the art will appreciate that other cryptographic algorithms, key types, or systems may be used without departing from the spirit of this disclosure.

A cryptographic key may be stored in a key vault. In one example, information relating to the cryptographic key may also be stored in the key vault, including, but not limited to, the type of algorithm, one or more initialization vectors, or a key expiration date. A key vault may be a software component (e.g., an encrypted data store, an access-restricted database, etc.), or may be a hardware device (e.g., a hardware security module, a trusted platform module, or other cryptographic hardware device). A key vault may be associated with a conversation participant, such that each participant has a key vault that is used to store cryptographic keys associated with messages of conversations to which the participant is a party. In some examples, the key vault may be further associated with the conversation, such that each conversation participant may have multiple key vaults used to store cryptographic keys associated with each individual conversation of which the participant is a member. In another example, there may be a centralized key vault used to store cryptographic keys for one or more conversations and/or one or more participants. As an example, a central key vault may be used to retain cryptographic keys in order to satisfy data retention requirements or legal obligations, among other reasons.

A cryptographic key may be associated with an identifier. The identifier may be used to access or locate the cryptographic key (e.g., in a key vault, a data store, etc.). In some examples, the identifier may indicate a specific key vault or provide another indication that may be used to locate the cryptographic key. Further, the identifier may be stored with or associated with the cryptographic key. As an example, a key vault storing a cryptographic key may also store an identifier associated with the cryptographic key. The key vault may index the cryptographic keys using the identifier in order to facilitate retrieval. The identifier may be a key fingerprint, a hash of the key or information relating to the key (e.g., MD5, SHA-1, etc.), or an identifier (e.g., a globally unique identifier (GUID), a uniform resource identifier (URI), etc.), among others.

One or more cryptographic keys used to encrypt conversation messages may be stored in an isolated collection. In one example, the isolated collection may store identifiers associated with the cryptographic keys, while the cryptographic keys may be stored elsewhere (e.g., in a key vault, a data store, etc.). In some examples, the cryptographic keys (or associated identifiers) may be stored in the same isolated collection as the messages to which the cryptographic keys relate. In one example, a cryptographic key may be associated with or related to a message (or vice versa) based on a correlation or other indirect association. For example, a variety of factors of the cryptographic key and/or message may be evaluated or analyzed, including, but not limited to, metadata (e.g., a timestamp, an author, etc.), storage method or location, or the communication method that was used. In another example, within the isolated collection, one or more asserted or inferred relationships may exist between a message resource and a cryptographic key resource. As a result, a cryptographic key used to encrypt a message may be determined by evaluating the relationships of a message resource. Similarly, a message associated with a cryptographic key may be determined by evaluating the relationships of a cryptographic key resource. Thus, when decrypting an encrypted message, the relationship between the message resource and the cryptographic key resource may be used to determine which cryptographic key should be used. In some examples, if the cryptographic key resource comprises a resource identifier, the resource identifier may be used to access the cryptographic key from a storage location (e.g., a key vault, a data store, etc.). Similarly, if the encrypted message resource comprises a resource identifier, the resource identifier may be used to access the encrypted message from a storage location.

When a conversation is initiated, a cryptographic key may be generated. As discussed above, the cryptographic key may be an asymmetric key pair or a symmetric key, among others. The cryptographic key may be distributed to the participants of the conversation. In another example, the cryptographic key may be stored such that it is available for use by the participants, but the cryptographic key itself may not be provided directly to the participants. As an example, the cryptographic key may be stored in a respective key vault of each participant.

When a conversation participant sends a message, the message may be encrypted using the cryptographic key before storing the message and/or transmitting the message to the other conversation participants. In some examples, multiple cryptographic keys may be used to successively encrypt the message. In one example, the conversation participant may encrypt the message prior to transmission using the cryptographic key. In the example where the conversation participant does not have direct access to the cryptographic key, the message may be received and encrypted by a computing device having access to the cryptographic key. The encrypted message may be stored within an isolated collection. The isolated collection may contain only the conversation of which the message is a part, may contain a subset of the messages of the conversation, may contain multiple conversations, or any combination thereof. In some examples, a relationship may be formed between the message and the cryptographic key used to encrypt the message. In other examples, properties or metadata may be stored with the encrypted message that indicates which cryptographic key was used to encrypt the message.

Other conversation participants may receive the encrypted message. The encrypted message may be transmitted to the other conversation participants, the participants may receive an indication that a new message is available (e.g., using a websocket, a webhook, etc.), or the conversation participants may periodically poll a resource (e.g., in an isolated collection, a resource within an isolated collection, etc. using long polling or other polling mechanisms) to determine whether new messages are available. In some examples, a conversation participant may then use received or retrieved information to access the encrypted message (e.g., from an isolated collection, from a data store, etc.). One of skill in the art will appreciate that a variety of message delivery methods may be used without departing from the spirit of this disclosure.

Once a conversation participant has received or accessed an encrypted message, the cryptographic key required to decrypt the encrypted message may be determined. In some examples, a plurality of cryptographic keys may be required to decrypt the encrypted message. The determination may be based on a relationship between the message resource and a cryptographic key resource in an isolated collection. In other examples, the conversation participant may evaluate properties or metadata associated with the message. It may then be further determined whether the required cryptographic key is accessible for use in decrypting the message. Determining whether the cryptographic key is accessible may comprise evaluating whether the cryptographic key is available in a key vault. As discussed above, the key vault may be participant-specific, conversation-specific, centralized, or any combination thereof, among others. In some examples, an identifier associated with the cryptographic key may be used to perform a search or generate an access request. In an example where a message has been successively encrypted using multiple cryptographic keys, multiple determinations may be made so as to determine whether each of the multiple cryptographic keys is accessible. Each cryptographic key may be stored in the same key vault or different key vaults as other cryptographic keys, or may have similar or different properties.

If it is determined that the cryptographic key is accessible, the cryptographic key may be used to decrypt the message and provide the message contents to a conversation participant. In one example, multiple cryptographic keys may be used to successively decrypt the message and provide the message contents to the conversation participant. If, however, the cryptographic key is determined to be inaccessible (e.g., not present in a key vault, an access request was denied, etc.), the encrypted message may be disregarded. In some examples, an indication may be provided to the conversation participant that a message was received but its contents were not decrypted. As an example, the indication may comprise a visual indicator (e.g., garbled or otherwise redacted text, an icon, etc.).

During the conversation session, an event may occur that results in the generation of a new cryptographic key. The event may be periodic (e.g., hourly, daily, after six hours, on a specific day of the week, at a specific time, etc.) or may be rule-based (e.g., a change in conversation membership, a request from a conversation participant, etc.). The new cryptographic key may have similar properties or may have different properties as compared to the old cryptographic key. In some examples, attributes of the conversation state or the event may be evaluated when generating the new cryptographic key. As an example, it may be determined that a high-level employee has joined the conversation and that, as a result, messages should be encrypted using a higher-security key length and/or a stronger cryptographic algorithm. The new cryptographic key may be stored in a similar or different manner to the old cryptographic key as discussed above.

When a conversation participant leaves the conversation session, the cryptographic key used for the conversation session may change, thereby ensuring that future messages may not be decrypted by the now former conversation participant. However, given that the former conversation participant may still have access to the cryptographic keys used for conversation messages that were previously encrypted, the former conversation participant may still be able to access old messages from the conversation session. Similarly, when a conversation participant joins a conversation, the new conversation participant may receive the newly-generated cryptographic key and, as a result, may be able to send and receive messages in the conversation. However, given that the new conversation participant does not have access to previous cryptographic keys, the new conversation participant may be unable to decrypt messages that were previously transmitted.

As a result of encrypting the messages using the cryptographic keys, it may be possible to easily purge or delete past messages by deleting the encryption keys required to decrypt the messages. As an example, keys stored in a key vault may be periodically purged, or may be purged in response to the satisfaction of a rule, thereby ensuring that the messages associated with the purged keys are inaccessible or effectively deleted. In another example, keys and/or associated encrypted messages may instead be retained or placed into escrow in order to comply with governance policies, data retention polices, or legal obligations, among other reasons. In some examples, certain messages may be re-keyed in order to purge only a subset of messages associated with a cryptographic key.

Conversation membership may remain the same even if the conversation is accessed by a different set of people. More specifically, a participant's conversation membership may be tied to a user account or a position within an organization, among others. As such, conversation membership may be granted or revoked based on access to the conversation participant's cryptographic keys associated with messages of the conversation. This may permit multiple people or users to occupy the role of a conversation participant without requiring that new cryptographic keys be generated whenever the identity of the conversation participant changes. As an example, this may permit access to be granted to a rotating "officer of the day," wherein one user of a plurality of users is given periodic, rotating access to the conversation.

In the example where the cryptographic key is an asymmetric key pair, the public key of the key pair may be provided to a group more inclusive than or other than the conversation participants having access to the private key of the cryptographic key pair. As a result, there may be additional conversation participants with "write-only" access, wherein the write-only conversation participants may add messages to the conversation, but are unable to read or otherwise gain access to the content of the conversation. By contrast, those participants having access to the private key may have "read-access" to the messages, as they are able to decrypt the conversation messages that are encrypted using the associated public key.

In some examples, the read-access conversation participants may re-encrypt a public-key encrypted message using a different cryptographic key, thereby "uncloaking" a message that was transmitted by a write-only conversation participant. The different cryptographic key may be more widely available than the private key. For example, the different cryptographic key may be provided to a similar group of conversation participants as those having access to the public key. As a result, conversation participants having access to the different cryptographic key may be able to read the uncloaked messages. In this way, it may be possible to provide a moderated forum for discussion, wherein a group of moderators (e.g., read-access conversation participants) may approve or uncloak messages received from a larger group of conversation participants (e.g., write-only conversation participants). In some examples, uncloaked messages may be stored in the same isolated collection as the original public-key encrypted messages, or may be stored in a different isolated collection.

As an example, a conversation session may be initiated between a plurality of conversation participants. The conversation session may occur using at least one of many communication methods, including, but not limited to, electronic mail, instant messaging, or text or multimedia messaging. Similarly, many types of data may be communicated during the conversation session, such as messages containing textual data, audio data, video data, image data, or binary data, among others. One of skill in the art will appreciate that different communication methods may be used and varying content may be communicated without departing from the spirit of this disclosure.

When the conversation session is initiated, a cryptographic key may be generated and stored in one or more key vaults. The cryptographic key may be made available to the plurality of conversation participants. The conversation participants may then exchange messages, wherein each message may be encrypted using the cryptographic key before it is provided to the conversation participants. Further, the encrypted messages may be stored in one or more isolated collections, such that the conversation messages are available for decryption by the conversation participants using the associated cryptographic key. In some examples the cryptographic key may be stored or associated with each encrypted message to facilitate retrieval of the requisite cryptographic key.

At some point, an event may occur. As discussed above, the event may be periodic or rule-based. As an example, the event may comprise a change in conversation membership (e.g., a conversation participant may join or leave the conversation, among others). As a result of the event, a new cryptographic key may be generated and made available to the current group of conversation participants (e.g., by storing it in one or more key vaults). The conversation participants may then use the new cryptographic key to encrypt and decrypt messages as the conversation session continues, thereby ensuring that subsequent messages remain secure and are not readable by former conversation participants. Similarly, if a new participant joined the conversation session, the new participant would only have access to the new cryptographic key (but not any old cryptographic keys), and would therefore be unable to decrypt messages that were communicated prior to joining the conversation session.

The conversation session may continue, during which the cryptographic key used for encrypting and decrypting conversation messages may be rotated as a result of one or more periodic or rule-based events. As such, the conversation may remain secure and access to subparts of the conversation may be managed by controlling access to the one or more cryptographic keys with which the various conversation subparts are encrypted. In some examples, the cryptographic keys may be purged to effectively delete subparts of the conversation. In other examples, the cryptographic keys may be retained in order to satisfy data retention requirements or other legal obligations.

FIG. 1 illustrates an overview of an example system for partially encrypting conversations as described herein. Example system 100 may be a combination of interdependent components that interact to form an integrated whole for performing delegated authentication. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 8-11. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various data sets and graphical representations. In examples, the various datasets may comprise (or be otherwise associated with), for example, resource identifiers, resource metadata, relationship information, asserted relationships, graphical mapping information, query data, rule sets, such as, for example, inference rules, authorization information, authentication information, etc., as discussed in further detail below. Generally, the datasets are stored on one or more server devices 106A-C and are accessible by the client devices 102A-C. In some examples, however, the datasets may be at least partially stored on one or more of the client devices 102A-C The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may be further configured to interrogate data stores comprising the resources corresponding to the resource identifiers in the various data sets. In examples, client devices 102A-C may interrogate content providers, such as server device 102A-C, via distributed network 104. The interrogation may include identifying the remote device on which a resource is located, and/or determining whether the remote device (or a service/separate remote device) has authenticated access to the resource. If access to the resource has been authenticated, client devices 102A-C may retrieve an authentication indication from the remote device. Client devices 102A-C may use the authentication indication to provide access to one or more of the various datasets comprising the corresponding resource identifier.

Server devices 106A-C may be configured to store and/or provide access to one or more resources. For example, server device 102A may be a web server, server device 102B may be a device comprising a collaborative messaging tool and a calendaring application, and server device 102C may be electronic mail server. Each of these devices may comprise a repository of resources that is accessible via one or more authentication mechanisms. In examples, server devices 106A-C may perform or monitor the authentication process when a request for a resource is received. If the authentication is successful, the authenticating device may store or maintain an authentication indication for a specified period of time. When the period of time expires, server devices 106A-C may remove or attempt to renew the authentication indication. In examples, server devices 106A-C may provide the authentication indication to an interrogating client device. In some aspects, server devices 106A-C may further be configured to store at least a portion of the various data sets and graphical representations, as discussed above.

Figure 2:
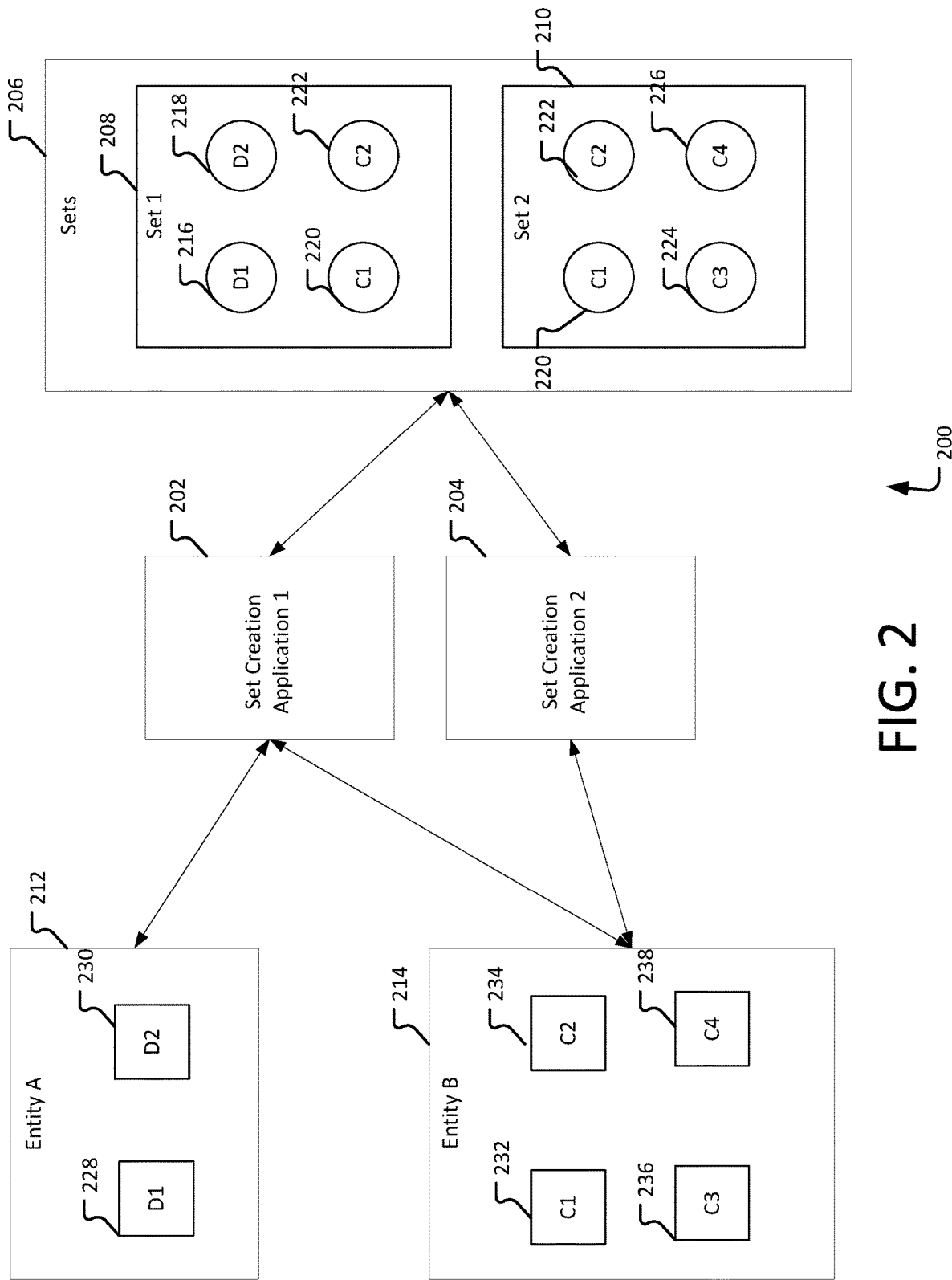
FIG. 2 illustrates an overview of an example system for managing isolated collections of resource identifiers and corresponding relationships.

FIG. 2 illustrates an overview of an example system 200 for managing isolated collections of resource identifiers and corresponding relationships. The isolated collection techniques implemented in system 200 may comprise or be associated with one or more of the delegated authentication techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define collections of relationships between resources (e.g., people, files, tasks, mail, documents, calendar events, etc.) and executing queries on those collections. Set creation applications 202 and 204 may further provide for defining and storing rulesets used to infer one or more relationships in the collections, and displaying graphical representations of the collection data. The defined rulesets may be stored in the Set itself, and in some examples is stored as metadata within the Set. In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be collocated with a Set creation application, or environment 206 may be located remotely from the Set creation application. Environment 206 may provide access to one or more data collections, such as Sets 208 and 210. In examples, access to the data collections may be determined using one or more sets of permissions generated and/or maintained by Set creation applications 202 and 204. The sets of permissions may be different across one or more of the data collections. As a result, one or more of the data collections (or functionality associated therewith) may not be accessible from one or more of Set creation applications 202 and 204.

Sets 208 and 210 may respectively comprise isolated collections of asserted resource identifiers and corresponding relationships. The relationships in the isolated collections may be defined manually or may be automatically derived using one or more rulesets. The isolated collections may be represented using graphical structures that directly relate resources in the data collection and provide for retrieving relationship data with a single operation. Each isolated collection may comprise resource identifiers that are unique to that isolated collection. Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource, but is not itself a resource. Exemplary types of resource identifiers include, but are not limited to, a Uniform Resource Identifier (e.g., a Uniform Resource Locator (URL), a Uniform Resource Name (URN) etc.), an IP address, a memory or storage address, and the like. One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers. For example, as depicted in FIG. 2, resource provider 212 may be a data store comprising various different types of resources such as resource 228 (e.g., document 1 (D1)) and resource 230 (e.g., presentation 2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238. In some aspects, resource providers 212 and 214 may be accessible by Set creation applications 202 and 204. Set creation applications 202 and 204 may access resource providers 212 and 214 to determine the existence of resources and/or retrieve information associated with the resources (e.g., resource metadata, resource location, resource identifiers, permission sets, authentication data, etc.). The information retrieved from resource providers 212 and 214 may be used to determine a set of resource identifiers corresponding to one or more of the available resources. The set of resource identifiers may be used to create one or more isolated collections of asserted resource identifiers and corresponding relationships. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authentication and access restrictions, retrieve the document (D1) 228. As another example, as depicted in FIG. 2, resource provider 212 may be accessed by Set creation application 202. Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
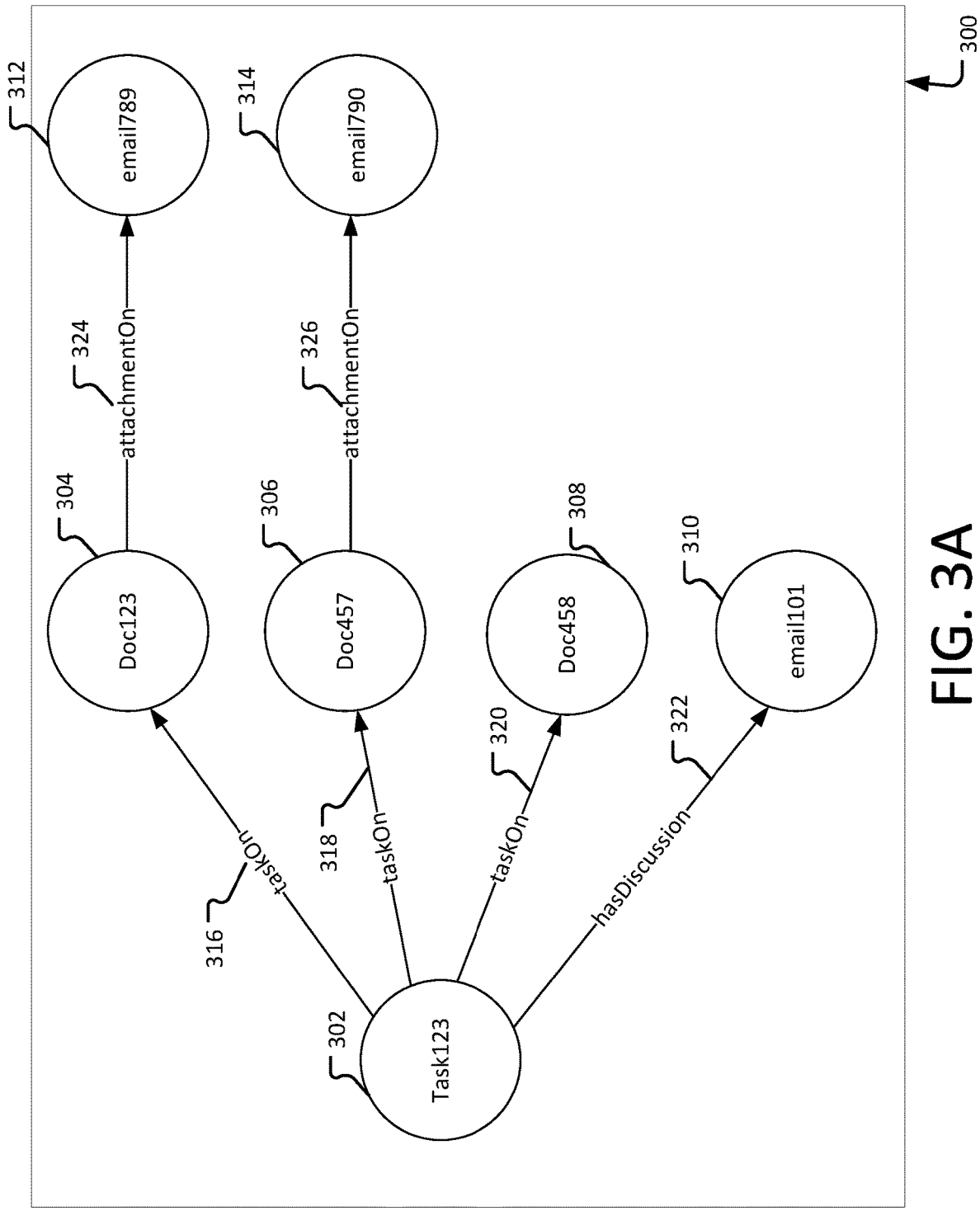
FIG. 3A illustrates an overview of an example isolated collection.

FIG. 3A illustrates an example isolated collection 300 of asserted resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge." The collection creation utility may also identify resources and/or determine resource types for collections using one or more rulesets that may include rules defined in accordance with semantic web technologies, such as resource description framework (RDF), RDF schema (RDFS), SPARQL Protocol and RDF Query Language (SPARQL), Web Ontology Language (OWL), etc. For example, collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a developer through a Sets creation application. For instance, a developer may manually add each of the resource identifiers and the relationships between the resource identifiers. As an example, the developer may manually indicate that the "task123" is a task on "Doc123," as represented in the collection 300 by the "taskOn" relationship 316. The resource identifiers and relationships may also be asserted by an external bot or application created by a developer. For instance, an add-in may be programmed to monitor activity in a browser or other application to track usage of the application. Based on the usage of the application, the add-in sends additional resources and relationships to be included in the collection 300.

In contrast to the asserted resource identifiers and relationships, a collection creation utility may execute a ruleset to determine additional relationships and resource types, referred to herein as "inferred relationships" and "inferred resource identifiers" or "inferred resource types." For example, upon execution of a ruleset, the collection creation utility may determine that resource identifier 312 represents an email message, and resource identifier 304 represents a document. Generation of inferred relationships and resources is discussed in further detail below.

Isolated collection 300 further depicts that resource identifier 302 is associated with resource identifiers 304, 306 and 308 and resource identifier 310. The collection creation utility may determine that the resource identifier 302 represents a task to be performed on identifiers 304, 306, and 308. Based on this determination, the collection creation utility may assign relationships 316, 318 and 320 (e.g., "taskOn") to define the association between resource identifier 302 and resource identifier 304, 306 and 308. In other examples, the relationships 316, 318, and 320 may be asserted, as discussed above. Additional relationships, such as the "hasDiscussion" relationship 322 may have been asserted manually by a developer or asserted from an add-in of an e-mail application that analyzed the content of e-mail 101. While specific types of resources and relationships are described in FIG. 3A, one of skill in the art will appreciate that other types of resources and/or relationships may be included in an isolated collection without departing from the spirit of this disclosure.

Figure 3C:
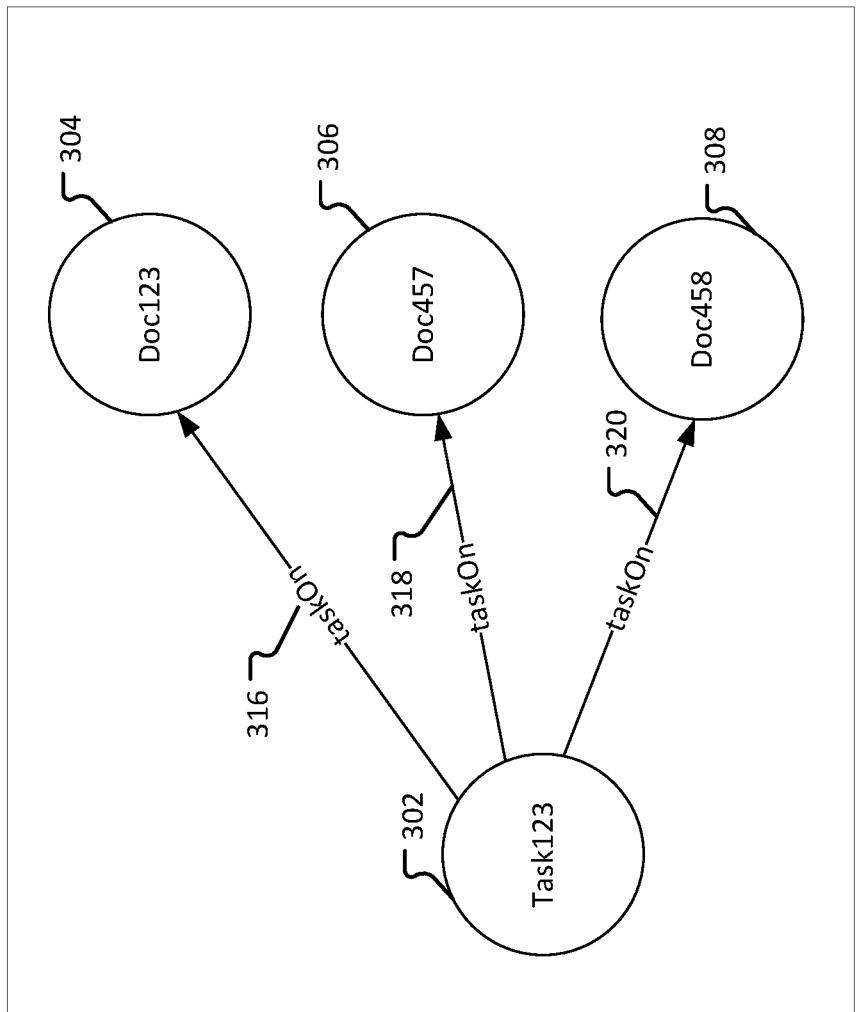
Figure 3B:

FIGS. 3B-3E illustrate an example query model that may be used to traverse collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as collection 300. For example, the entire collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an email comprising the subject "API Design" and resource identifier 314 may represent an email comprising the subject "Sets." The query 'http:// . . . /collection300/task123' may be executed against collection 300. The query results may comprise resource identifier 302 and be visualized as illustrated in FIG. 3B. In FIG. 3C, the query has been amended to 'http:// . . . /collection300/task123?$expand=taskOn' and executed against collection 300. The query results may comprise resource identifiers 302, 304, 306 and 308 and relationships 316, 318 and 320, and be visualized as illustrated in FIG. 3C. In FIG. 3D, the query has been amended to 'http:// . . . /collection300/task123?$expand=taskOn ($expand=attachmentOn)' and executed against collection 300. The query results may comprise resource identifiers 302, 304, 306, 308, 312 and 314 and relationships 316, 318, 320, 324 and 326, and be visualized as illustrated in FIG. 3D. In FIG. 3E, the query has been amended to 'http:// . . . /collection300/task123?($expand=taskOn ($expand=attachmentOn)($filter=Subject eq 'Sets'))' and executed against collection 300. As only resource identifier comprises 314 the subject "Sets", the query results may comprise resource identifiers 302, 306 and 314 and relationships 318 and 326, and be visualized as illustrated in FIG. 3E.

Figure 4A:
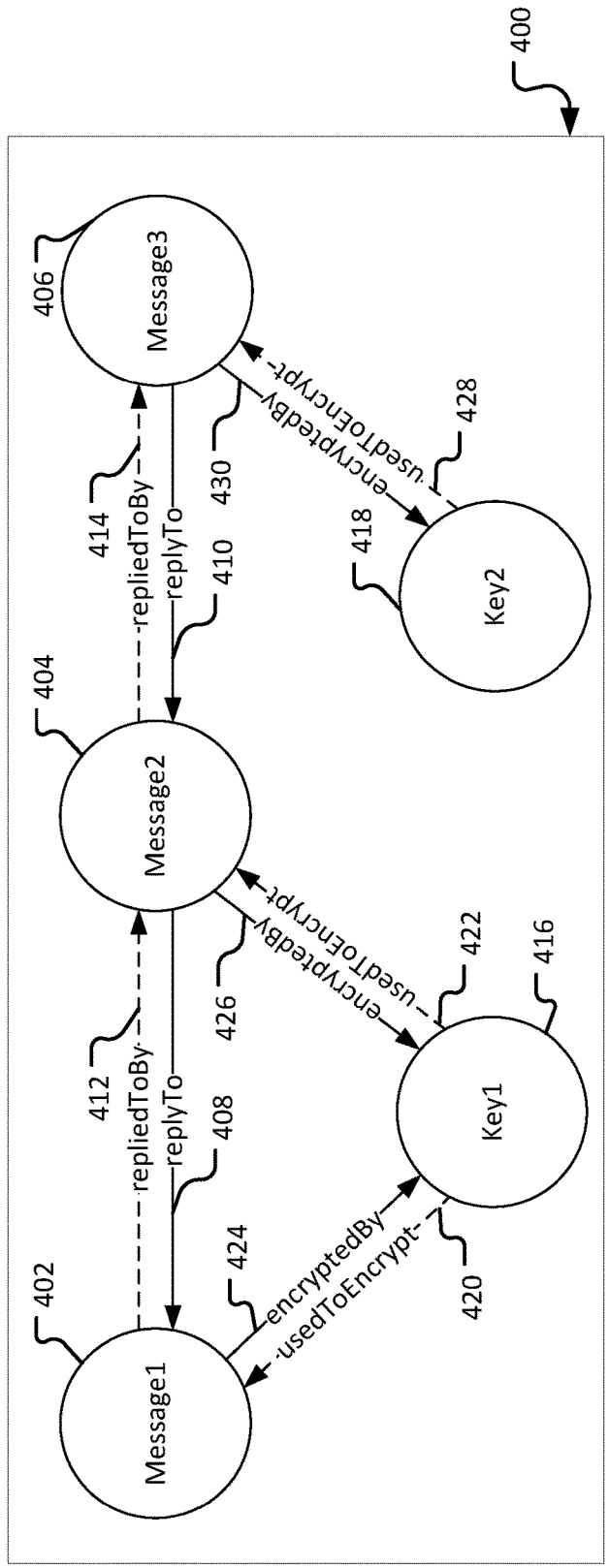
FIG. 4A illustrates an overview of an example partially encrypted conversation stored in an isolated collection.

FIG. 4A illustrates an overview of an example partially encrypted conversation stored in an isolated collection 400. Isolated collection 400 is comprised of Message1 402, Message2 404, and Message3 406. Message1 402, Message2 404, and Message3 406 may be messages (or references to messages) that were communicated during a conversation session as disclosed herein. Relationships 408 and 410 use a solid arrow to indicate that an asserted relationship of "replyTo" exists between Message2 404 and Message1 402, and Message3 406 and Message2 404, respectively. Relationships 408 and 410 are directional, in that they indicate that Message2 was a reply to Message1 and that Message3 was a reply to Message2, rather than the other way around. Similarly, relationships 412 and 414 use a dashed arrow to indicate that an inferred relationship of "repliedToBy" exists between Message1 402 and Message2 404, and Message2 404 and Message3 406, respectively. Relationships 412 and 414 are directional, in that they indicate that Message1 402 was replied to by Message2 404 and that Message2 404 was replied to by Message3 406, rather than the other way around.

Isolated collection 400 also comprises Key1 416 and Key2 418, which may be cryptographic keys (or references to cryptographic keys) used to encrypt messages within the partially encrypted conversation. More specifically, Key1 416 may have been generated earlier in the conversation session and used to encrypt Message1 402 and Message2 404. Accordingly, relationships 424 and 426 use a solid arrow to indicate that an asserted relationship of "encryptedBy" exists between Message1 402 and Key1 416, and Message2 404 and Key1 416, respectively. As such, relationships 424 and 426 indicate that Message1 402 and Message2 404 are each encrypted by Key1 416. Further, relationships 420 and 422 use a dashed arrow to indicate that an inferred relationship of "usedToEncrypt" exists between Key1 416 and Message1 402, and Key1 416 and Message2 404, respectively. As a result, it may be possible to determine that Key1 416 was used to encrypt both Message1 402 and Message2 404.

Similarly, Key2 418 may have been generated after the occurrence of an event, as disclosed herein, after which Key2 418 may have been generated and used to encrypt Message3 406. Accordingly, relationship 430 uses a solid arrow to indicate that an asserted relationship of "encryptedBy" exists between Message3 406 and Key2 418. Further, relationship 428 uses a dashed arrow to indicate that an inferred relationship of "usedToEncrypt" exists between Key2 418 and Message3 406. As a result, it may be possible to determine that Key2 418 was used to encrypt Message3 406 and that Message3 406 was encrypted by Key2 418.

Figure 4B:
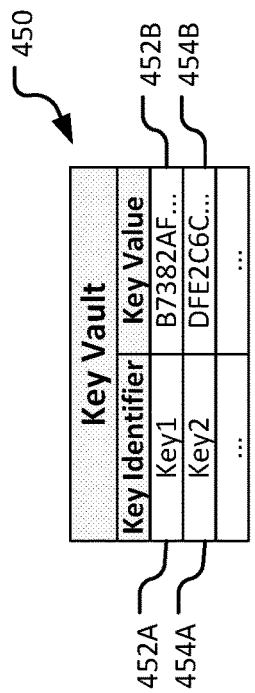
FIG. 4B illustrates an overview of an example key vault associated with a partially encrypted conversation.

FIG. 4B illustrates an overview of an example key vault 450 associated with a partially encrypted conversation. As discussed above, key vault 450 may be a key vault that is specific to a conversation participant, a conversation, or it may be a central key vault, among others. Key vault 450 may be comprised of one or more key entries, wherein each key entry is comprised of a key identifier and a key value. As discussed above, a key identifier may be may be a key fingerprint, a hash of the key or information relating to the key (e.g., MD5, SHA-1, etc.), or an identifier (e.g., a GUID, a URI, etc.), among others. The key value may be the data relating to the cryptographic key stored by the key vault.

Key vault 450 is comprised of a first key entry 452A-B and a second key entry 454A-B. The first key entry comprises a key identifier Key1 452A and a key value 452B. Similarly, the second key entry comprises a key identifier Key2 454A and a key value 454B. In some examples, example key vault 450 may be indexed according to key identifiers 452A and 454A, such that it may be possible to search for the associated key values (e.g., key values 452B and 454B) using a key identifier (e.g., "Key1" or "Key2").

With reference to FIGS. 4A and 4B, a conversation participant may wish to decrypt messages stored by isolated collection 400. As such, Message1 402 may be accessed and an appropriate cryptographic key may be determined. In an example, the appropriate cryptographic key may be determined by evaluating relationship 424 to determine that Key1 416 should be used to decrypt Message1 402. As a result, a determination may be made as to whether Key1 416 is accessible to perform decryption of Message1 402. In some examples, key vault 450 may be accessed to determine whether an identifier matching that of Key1 416 is present. If the conversation participant has access to Key1 452A in key vault 450, key value 452B may be used to decrypt Message1 402. Alternatively, if it is determined that key value 452B is inaccessible, an indication may be provided that Message1 402 was not decrypted.

Similarly, Message2 404 may be accessed (e.g., based on "repliedToBy" relationship 412) and an appropriate cryptographic key may be determined. In an example, the appropriate cryptographic key may be determined by evaluating relationship 426 to determine that Key1 416 should be used to decrypt Message2 404. As a result, a determination may be made as to whether Key1 416 is accessible to perform decryption of Message2 404. In some examples, key vault 450 may be accessed to determine whether an identifier matching that of Key1 416 is present. If the conversation participant has access to Key1 452A in key vault 450, key value 452B may be used to decrypt Message2 404. Alternatively, if it is determined that key value 452B is inaccessible, an indication may be provided that Message2 404 was not decrypted. Given that Message1 402 and Message2 404 were encrypted using the same cryptographic key Key1 416, information relating to Key1 416 may be cached such that at least some of the subsequent access determinations described above with respect to the decryption of Message2 404 may not be required.

During the conversation session, conversation membership may have changed, causing a new key (e.g., Key2 418) to be generated. As such, subsequent messages (e.g., Message3 406) may have been encrypted using the new key. Thus, in order to decrypt Message3 406, the message may be accessed (e.g., based on "repliedToBy" relationship 414) and an appropriate cryptographic key may be determined. In an example, the appropriate cryptographic key may be determined by evaluating relationship 430 to determine that Key2 418 should be used to decrypt Message3 406. As a result, a determination may be made as to whether Key2 418 is accessible to perform decryption of Message3 406. In some examples, key vault 450 may be accessed to determine whether an identifier matching that of Key2 418 is present. If the conversation participant has access to Key2 454A in key vault 450, key value 454B may be used to decrypt Message3 406. Alternatively, if it is determined that key value 454B is inaccessible, an indication may be provided that Message3 406 was not decrypted.

In another example, a conversation participant may wish to decrypt those messages within a conversation that are accessible to the conversation participant. If the conversation participant has access to Key1 452A-B associated with Key1 416, it may be determined that Message1 402 and Message2 404 may be decrypted (e.g., using key value 452B) based on "usedToEncrypt" relationships 420 and 422. Similarly, if the conversation participant has access to Key2 424A-B associated with Key2 418, it may be determined that Message3 406 may be decrypted (e.g., using key value 454B) based on "usedToEncrypt" relationship 428. Thus, just as it may be possible to determine which cryptographic key is required using an "encryptedBy" relationship, it may be possible to determine messages that may be decrypted using a specific key based on a "usedToEncrypt" relationship.

Figure 5:
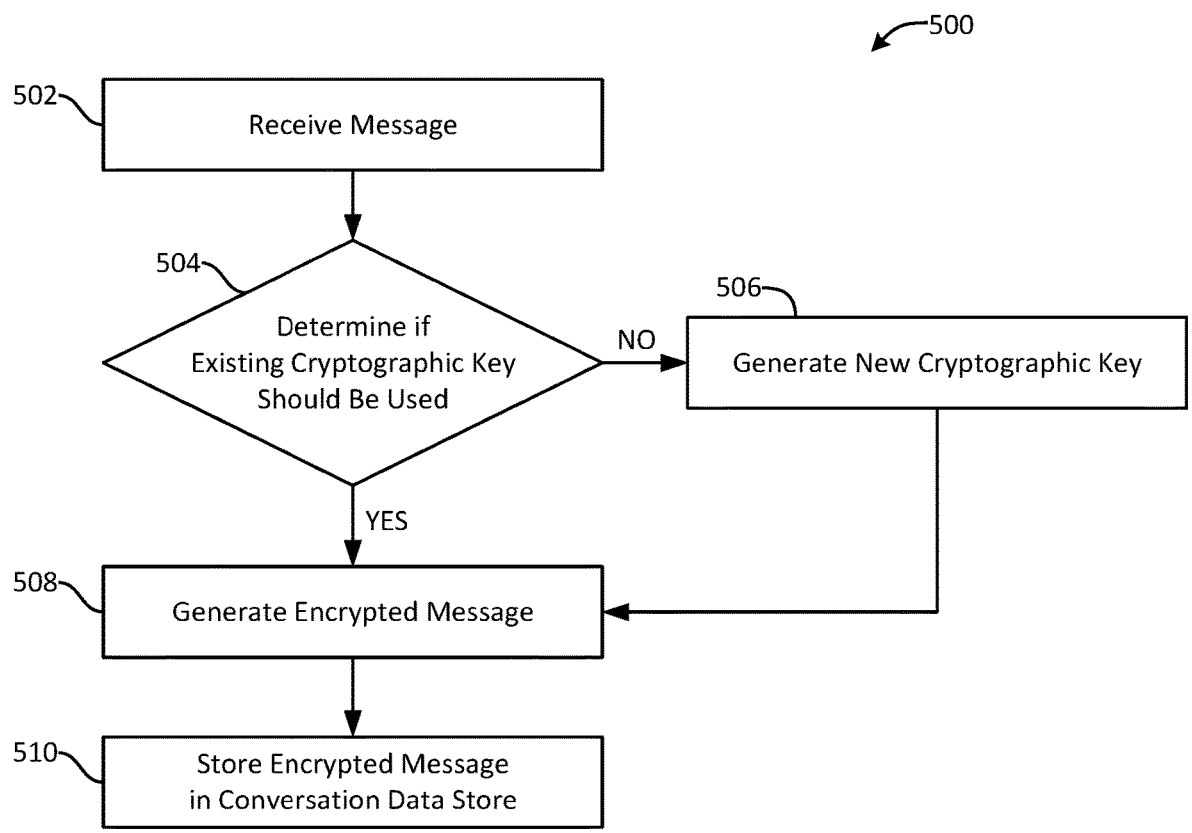
FIG. 5 illustrates an overview of an example method for encrypting a message comprising a partially encrypted conversation.

FIG. 5 illustrates an overview of an example method 500 for encrypting a message comprising a partially encrypted conversation. Method 500 beings at operation 502, where a message may be received. The message may be received from a computing device of a conversation participant (e.g., a mobile computing device, a tablet computing device, a personal computing device, etc.). In some examples, the message may be received from client devices 102A-C in FIG. 1.

Moving to operation 504, a determination may be made whether an existing cryptographic key should be used. The existing cryptographic key may have been generated earlier in the conversation session. The determination may comprise evaluating whether an event has occurred since the existing cryptographic key was generated. As further described herein, the event may be periodic or rule-based. If it is determined that such an event has occurred since the existing cryptographic was generated, flow branches NO to operation 506, where a new cryptographic key may be generated. The new cryptographic key may be an asymmetric key pair or a symmetric key, among others. The new cryptographic key may be distributed to the participants of the conversation or may be stored such that it is available for use by the participants but is not directly accessible to the conversation participants. In some examples, attributes of the conversation state or the event may be evaluated when generating the new cryptographic key. In an example, the new cryptographic key may be stored in a key vault along with an identifier associated with the new cryptographic key. Further, the identifier may be stored within an isolated collection, such as the isolated collection in which messages of the conversation session are stored. In another example, the cryptographic key may be stored directly in the isolated collection. Flow then continues to operation 508 using the newly-generated cryptographic key, as discussed in further detail below. If, however, it is determined that the existing cryptographic key should be used, flow branches YES to operation 508 using the existing cryptographic key.

At operation 508, the message received at operation 502 may be encrypted using the determined cryptographic key (e.g., either the newly-generated cryptographic key or the existing cryptographic key based on the outcome of determination operation 504). Flow then moves to operation 510, where the encrypted message may be stored in a data store. In some examples, the encrypted message may be stored in an isolated collection (e.g., isolated collection 400 in FIG. 4). In another example, the encrypted message may be associated with a resource identifier and stored in a data store, while the resource identifier associated with the encrypted message may be stored in the isolated collection. The encrypted message may be associated with the cryptographic key used to encrypt the message, either by forming a relationship between the message and the cryptographic key within the isolated collection, or by storing properties or metadata that provides an indication as to which cryptographic key was used, among others. Flow terminates at operation 510.

Figure 6:
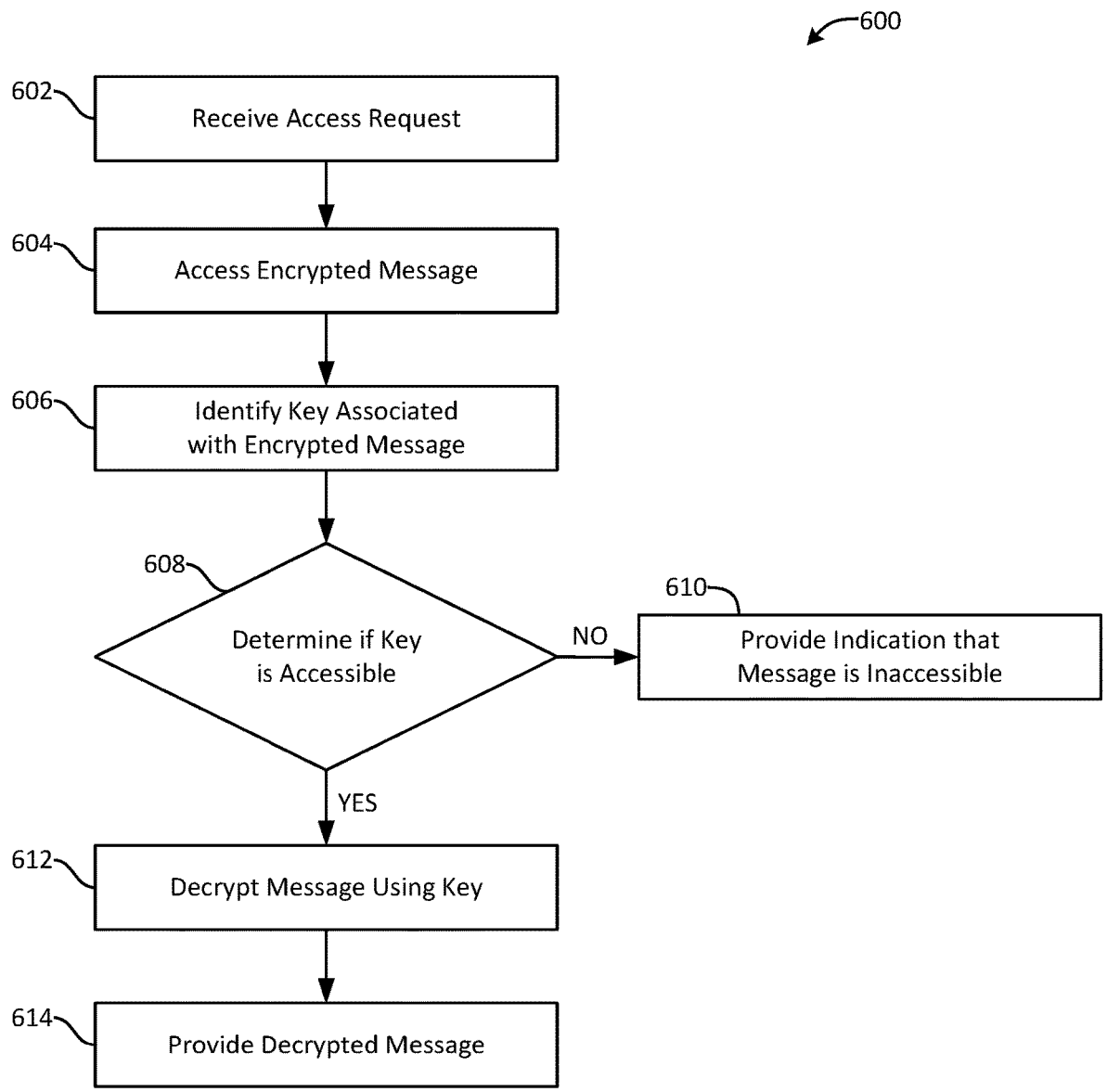
FIG. 6 illustrates an overview of an example method for decrypting a message within a partially encrypted conversation.

FIG. 6 illustrates an overview of an example method 600 for decrypting a message within a partially encrypted conversation. Method 600 begins at operation 602, where an access request may be received. The access request may be for a message, wherein the message may have been encrypted according to aspects disclosed herein (e.g., using method 500 as shown in FIG. 5). The access request may have been received from a computing device of a conversation participant (e.g., a mobile computing device, a tablet computing device, a personal computing device, etc.). In some examples, the message may be received from client devices 102A-C in FIG. 1.

Moving to operation 604, the encrypted message may be accessed. In some examples, accessing the encrypted message may comprise accessing the encrypted message within an isolated collection. In another example, a resource identifier associated with the encrypted message may be stored in the isolated collection, which may then be used to retrieve the message from a data store. At operation 606, a key associated with the encrypted message may be identified. Identifying the key may comprise evaluating a relationship of the encrypted message within the isolated collection (e.g., an "encryptedBy" relationship such as relationships 424, 426, and 430 in FIG. 4A). In another example, the key may be identified based on properties or metadata stored or associated with the encrypted message.

At operation 608, a determination may be made whether the key is accessible. In some examples, this may comprise searching for the identified key (e.g., using a key identifier associated with the key) in a key vault. As discussed herein, the key vault may be a key vault associated with a conversation participant, a conversation, or some combination thereof. Alternatively, the key vault may be a centralized key vault. In another example, the determination may comprise evaluating an access control list or other privileges relating to the conversation participant to determine whether the conversation participant is able to access the key (e.g., in a key vault, in a data store, etc.). If it is determined that the key is not accessible, flow branches NO to operation 610, where an indication may be provided that the key is inaccessible. As an example, the indication may comprise a visual indicator (e.g., garbled or otherwise redacted text, an icon, etc.). In other examples, no indication may be provided. Flow terminates at operation 610.

Alternatively, if it is determined at determination operation 608 that the key is accessible, flow moves to operation 612, where the message may be decrypted using the key. Decrypting the message may comprise accessing the key and performing the decryption operation. In another example, the message may be provided to another component or module having access to the key, and the component or module may decrypt the message. At operation 614, the decrypted message may be provided. In one example, the decrypted message may be communicated to a client device of a conversation participant. In some examples, the decrypted message may be displayed to the conversation participant. Flow terminates at operation 614.

Figure 7:
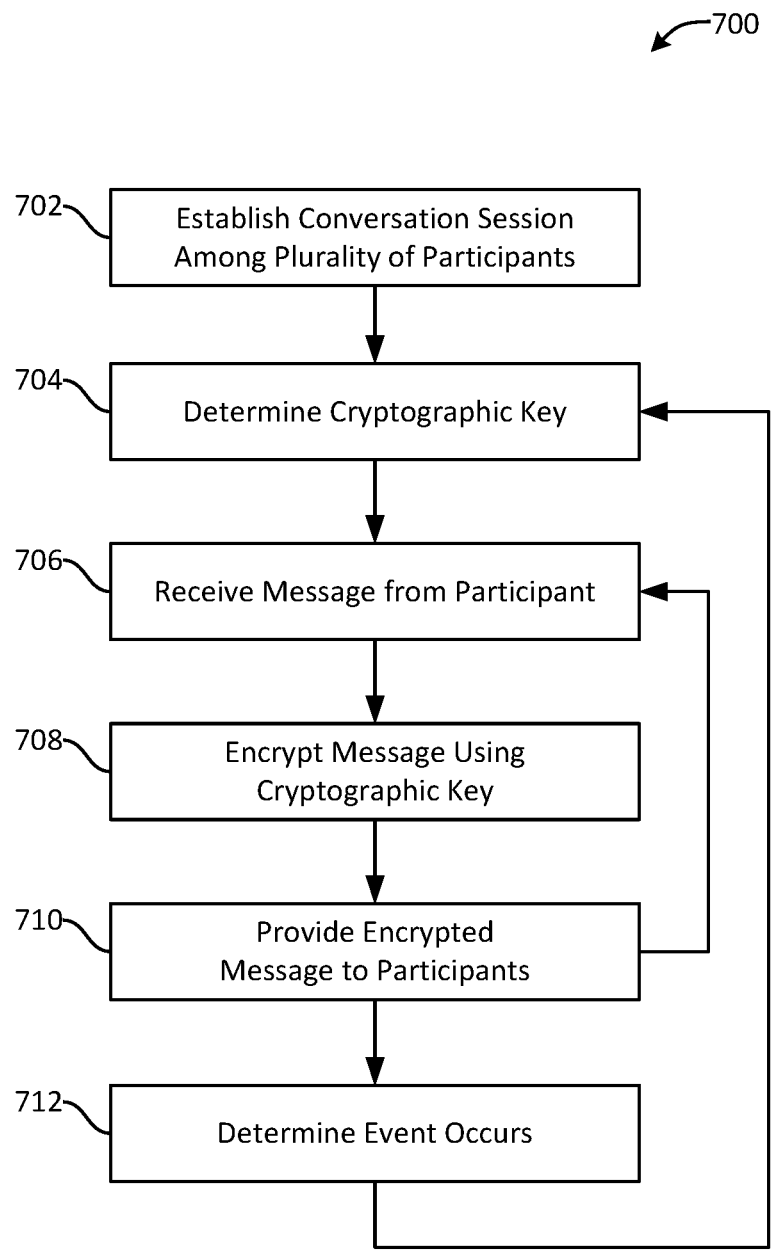
FIG. 7 illustrates an overview of an example method for performing partially encrypted communication.

FIG. 7 illustrates an overview of an example method 700 for performing partially encrypted communication. Method 700 begins at operation 702, where a conversation session may be established among a plurality of participants. Establishing a conversation session may comprise establishing a connection with each of the participants. In another example, an isolated collection may be created wherein messages communicated during the conversation session may be stored. Access to the isolated collection may be granted to the participants. In some examples, one or more key vaults may be generated, where keys used during the conversation session may be stored. The key vaults may be participant-specific, conversation-specific, or a combination thereof. In some examples, a central key vault may be used as an alternative to or in addition to other key vaults.

Moving to operation 704, an encryption key may be determined. Given that there are no preexisting keys, a new cryptographic key may be generated. As discussed above, the cryptographic key may be an asymmetric key pair or a symmetric key, among others. The cryptographic key may be distributed to the conversation participants. In another example, the cryptographic key may be stored such that it is available for use by the participants (e.g., in one or more key vaults), but the cryptographic key itself may not be provided directly to the participants. In some examples, the cryptographic key (or an associated identifier) may be stored in the isolated collection where messages from the conversation session will be stored.

At operation 706, a message may be received from a participant. In some examples, the message may be received from client devices 102A-C in FIG. 1. The message may be received using a secured or unsecured communication channel. After receiving the message, flow moves to operation 708, where the message may be encrypted using the cryptographic key that was determined in operation 704. Encrypting the message may comprise accessing the cryptographic key from a key vault (e.g., a central key vault, a participant key vault, etc.). The encrypted message may be stored in an isolated collection, and may be further associated with the cryptographic key (e.g., by forming an "encryptedBy" relationship between the stored message and the cryptographic key).

Moving to operation 710, the encrypted message may be provided to the conversation participants. In one example, the encrypted message may be transmitted to the conversation participants. In another example, the participants may receive an indication that a new message is available in the isolated collection or the participants may periodically poll the isolated collection to determine whether there is a new message. As a result, a conversation participant may issue a request for the message, causing the operations of method 600 set forth in FIG. 6 to be performed.

From operation 710, flow may loop between operations 706-710 as participants communicate with one another using the cryptographic key determined in operation 704. Eventually, flow may instead move to operation 712, where an event occurs. The event may be periodic (e.g., hourly, daily, after six hours, on a specific day of the week or at a specific time, etc.) or may be rule-based (e.g., a change in conversation membership, a request from a conversation participant, etc.).

As a result of the event occurring, flow may return to operation 704, where a cryptographic key may again be determined. In some examples, the determined cryptographic key may be a key that was previously used (e.g., the key was previously used for the same group of conversation participants, the key is used under specific conversation or environmental conditions, etc.). In other examples, a new key may be generated. The new cryptographic key may have similar properties or may have different properties. In some examples, attributes of the conversation state or the event the occurred at operation 712 may be evaluated when generating the cryptographic key. As an example, it may be determined that a high-level employee has joined the conversation and that, as a result, messages should now be encrypted using a higher-security key length and/or cryptographic algorithm. The new cryptographic key may be stored in a similar or different manner as was used for the previous cryptographic key as described above.

Flow may then continue between operations 706 and 710, wherein conversation participants may communicate messages between one another using the newly-determined key from operation 704. Flow may branch instead (e.g., periodically, as a result of the satisfaction of a rule, etc.) to operation 712, causing a new cryptographic key to be determined for and used in the conversation session moving forward.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
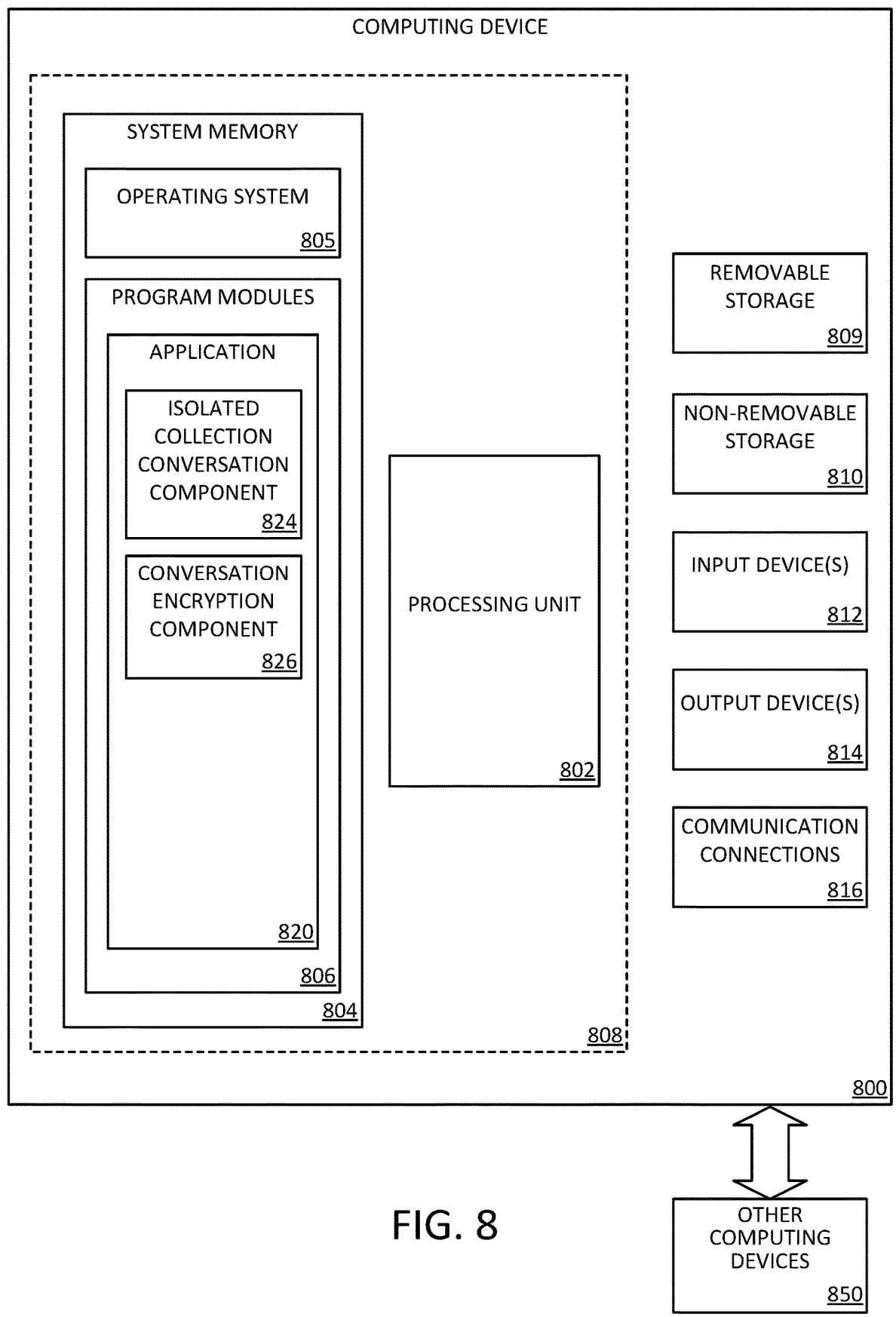
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above, including the client computing devices 102A-C and the server computing devices 106A-C. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for performing the various aspects disclosed herein such as a isolated collection conversation component 824 and conversation encryption component 826. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
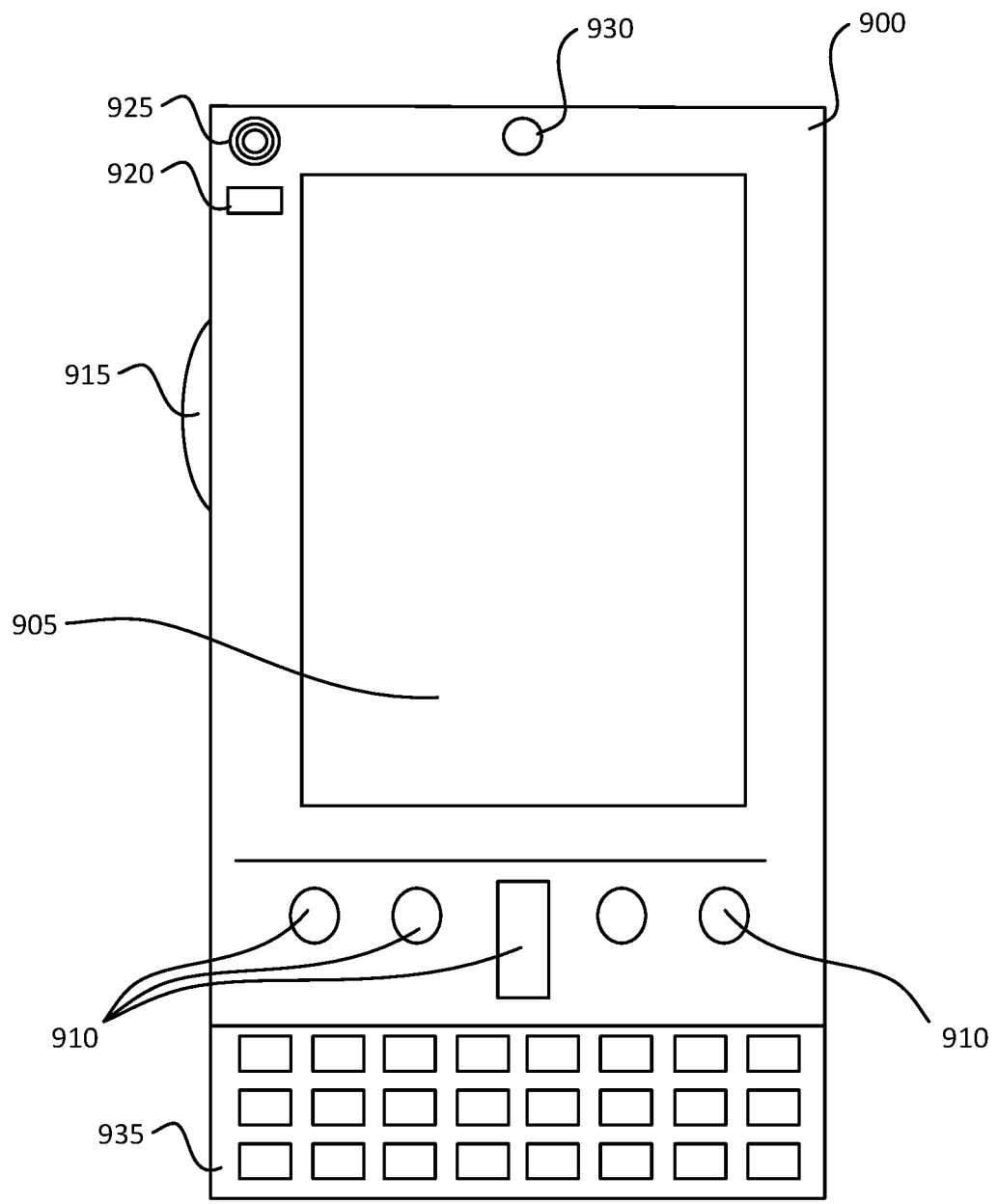
FIGS. 9A and 9B are simplified block diagrams of a mobile computing device with which aspects of the present disclosure may be practiced.
Figure 9B:
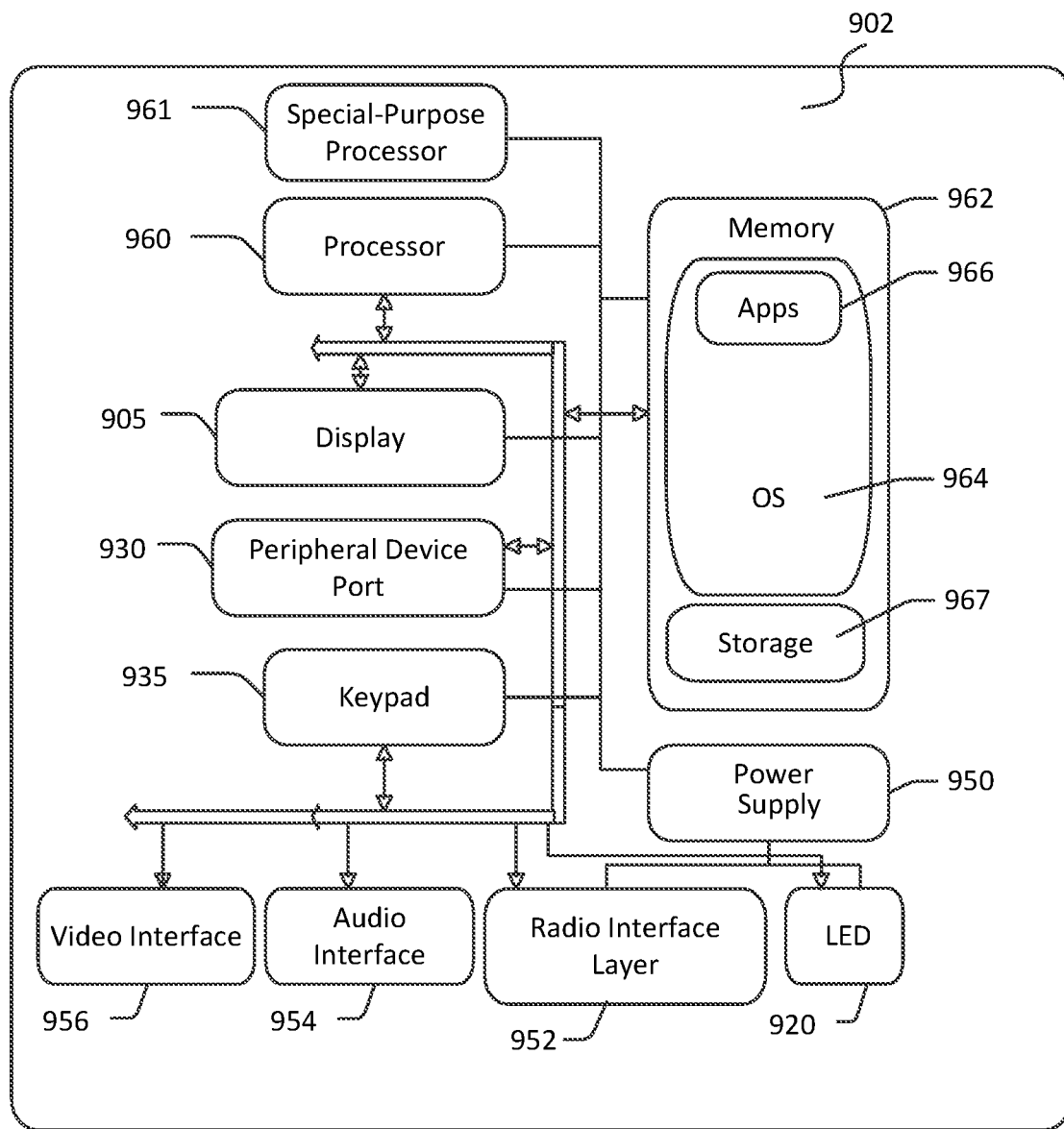

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
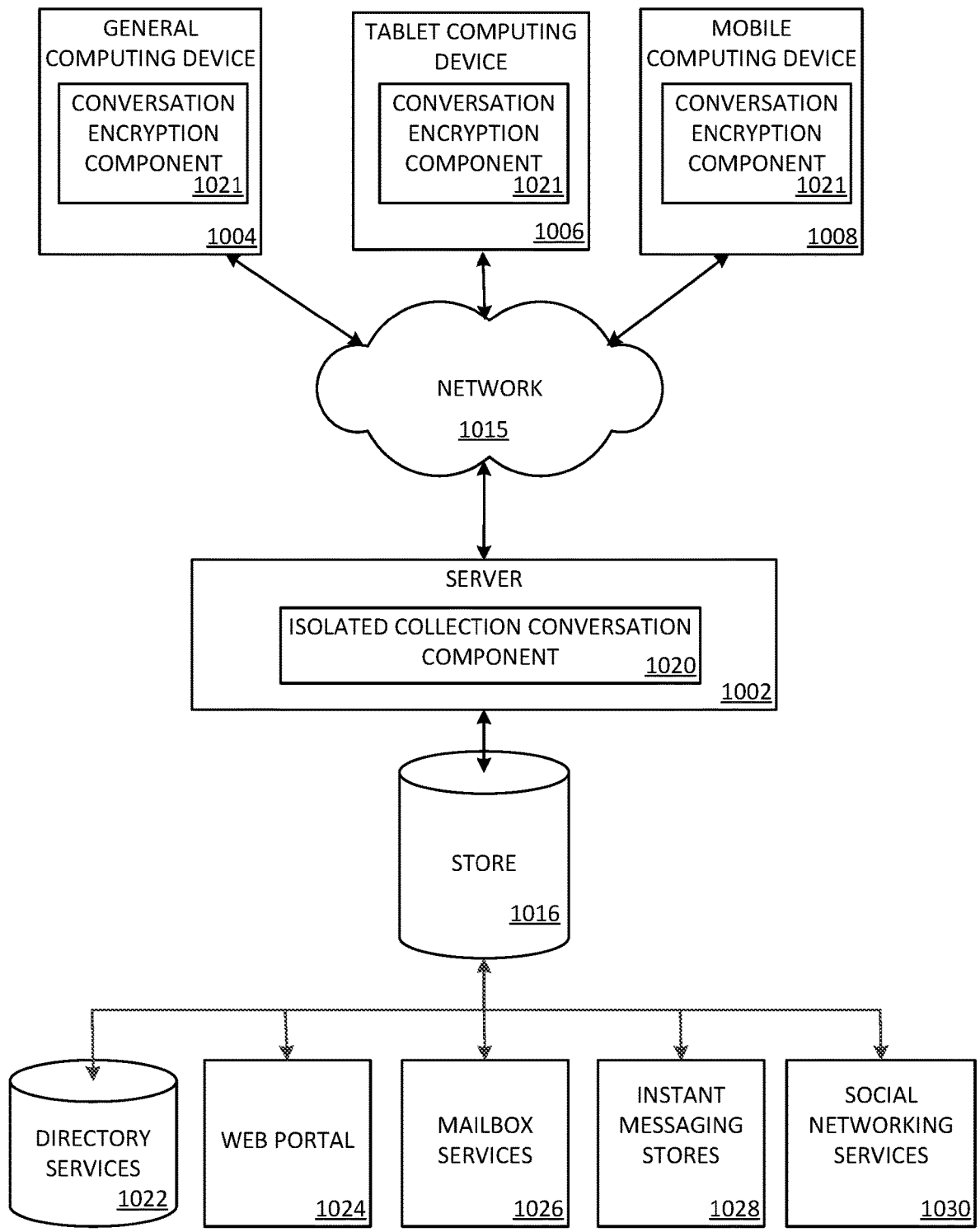
FIG. 10 is a simplified block diagram of a distributed computing system in which aspects of the present disclosure may be practiced.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. Conversation encryption component 1021 may be employed by a client that communicates with server device 1002, and/or isolated collection conversation component 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data usable to be either pre-processed at a graphic-originating system, or post-processed at a receiving computing system.

Figure 11:
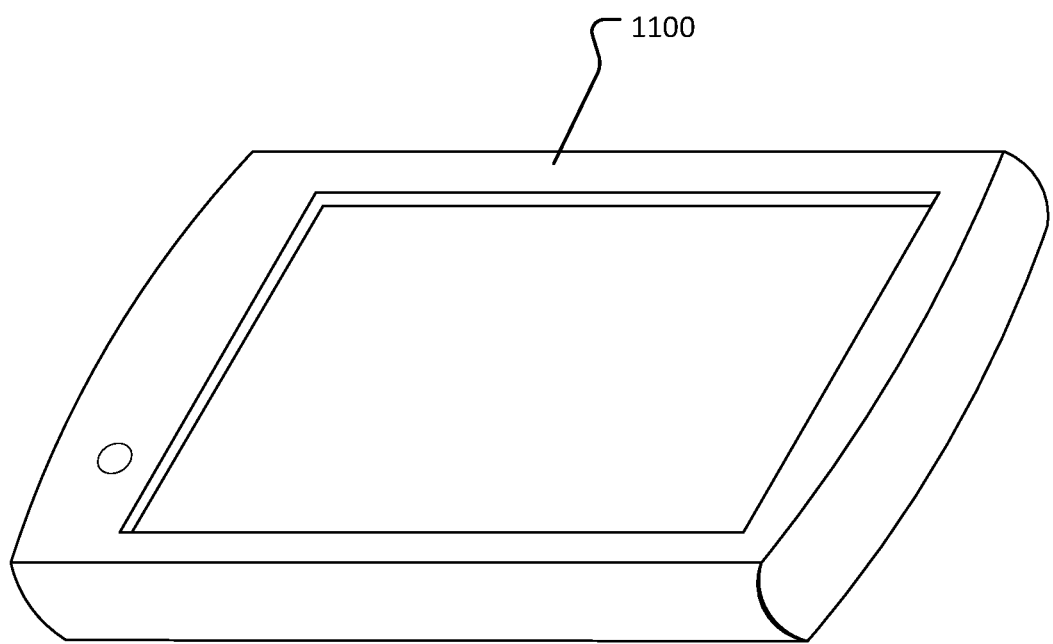
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and a memory storing instructions that when executed by the at least one processor perform a set of operations. The operations comprise receiving, from a computing device of a plurality of computing devices, a first message of the conversation session; generating, using a first cryptographic key, a first encrypted message of the first message; storing the first encrypted message, wherein the first encrypted message is associated with the first cryptographic key; providing, to one or more of the plurality of computing devices, an indication of the first encrypted message; determining an event occurred; in response to the determination, generating a second cryptographic key for use during the conversation session; receiving, from a computing device of the plurality of computing devices, a second message of the conversation session; generating, using the second cryptographic key, a second encrypted message of the second message; storing the second encrypted message, wherein the second encrypted message is associated with the second cryptographic key; and providing, to one or more of the plurality of computing devices, an indication of the second encrypted message. In an example, the first cryptographic key and the first encrypted message are stored in an isolated collection. In another example, providing an indication of the first encrypted message comprises providing an indication that a new message is available in the isolated collection. In a further example, associating the first encrypted message with the first cryptographic key comprises creating a relationship between the first encrypted message and the first cryptographic key in the isolated collection. In yet another example, generating the second cryptographic key comprises evaluating at least one of attributes of the event and attributes of the conversation session. In a further still example, the event is one of a change in membership of the plurality of computing devices and a determination that an amount of time has elapsed. In another example, the change in membership of the plurality of computing devices comprises at least one of adding a computing device to the plurality of computing devices and removing a computing device from the plurality of computing devices.

In another aspect, the technology relates to a computer-implemented method for decrypting a message of a partially encrypted conversation. The method comprises receiving, from a computing device, an access request for an encrypted message; accessing the encrypted message stored by an isolated collection; identifying a cryptographic key associated with the encrypted message; determining whether the identified cryptographic key is accessible; when it is determined that the cryptographic key is not accessible, providing an indication that the cryptographic key is inaccessible; when it is determined that the cryptographic key is accessible, generating, using the cryptographic key, a decrypted message of the encrypted message; and providing the decrypted message to the computing device. In an example, the cryptographic key is stored in a key vault and a key identifier associated with the cryptographic key is stored in the isolated collection. In another example, identifying the cryptographic key associated with the encrypted message comprises determining the key identifier using one or more relationships of the encrypted message in the isolated collection. In a further example, determining whether the identified cryptographic key is accessible comprises determining, based on the key identifier, whether the identified cryptographic key is in the key vault. In yet another example, the key vault is one of a central key vault, a key vault associated with the computing device, and a key vault associated with the partially encrypted conversation. In yet a further example, the access request is received in response to an indication that a new encrypted message is available.

In another aspect, the technology relates to another computer-implemented method for providing an encrypted conversation session. The method comprises receiving, from a computing device of a plurality of computing devices, a first message of the conversation session; generating, using a first cryptographic key, a first encrypted message of the first message; storing the first encrypted message, wherein the first encrypted message is associated with the first cryptographic key; providing, to one or more of the plurality of computing devices, an indication of the first encrypted message; determining an event occurred; in response to the determination, generating a second cryptographic key for use during the conversation session; receiving, from a computing device of the plurality of computing devices, a second message of the conversation session; generating, using the second cryptographic key, a second encrypted message of the second message; storing the second encrypted message, wherein the second encrypted message is associated with the second cryptographic key; and providing, to one or more of the plurality of computing devices, an indication of the second encrypted message. In an example, the first cryptographic key and the first encrypted message are stored in an isolated collection. In another example, the method further comprises: determining a second event occurred; in response to the determination of the second event, generating a third cryptographic key; generating, using the second cryptographic key, a decrypted message of the second encrypted message; generating, using the third cryptographic key, a re-keyed encrypted message of the decrypted message; and storing the re-keyed encrypted message, wherein the re-keyed encrypted message is associated with the third cryptographic key. In a further example, associating the first encrypted message with the first cryptographic key comprises creating a relationship between the first encrypted message and the first cryptographic key in the isolated collection. In yet another example, the method further comprises: determining a second event occurred; in response to the determination of the second event, generating a third cryptographic key; generating, using the third cryptographic key, a first successively encrypted message of the first encrypted message; and storing the first successively encrypted message, wherein the first successively encrypted message is associated with the first cryptographic key and the third cryptographic key. In yet a further example, the event is one of a change in membership of the plurality of computing devices and a determination that an amount of time has elapsed. In a further example, the change in membership of the plurality of computing devices comprises at least one of adding a computing device to the plurality of computing devices and removing a computing device from the plurality of computing devices.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, comprising:
   at least one processor; and
   a memory storing instructions that when executed by the at least one processor perform a set of operations comprising:
     accessing, as part of a conversation session among a first set of participants comprising a conversation participant, a first message encrypted with a first cryptographic key;
     decrypting, using the first cryptographic key, the first message to generate a decrypted first message;
     causing display of the decrypted first message to first set of participants who have access to the first cryptographic key;
     receiving a change in membership indication that the conversation session is among a second set of participants, wherein the second set of participants is different than the first set of participants and comprises the conversation participant;
     accessing, as part of the conversation session comprising the second set of participants, a second message encrypted with a second cryptographic key that is different than the first cryptographic key;
     decrypting, using the second cryptographic key, the second message to generate a decrypted second message; and
     causing display of the decrypted second message to the second set of participants who have access to the second cryptographic key.

2. The system of claim 1, wherein the set of operations further comprises:
   receiving user input of a third message for the conversation session;
   generating, using the second cryptographic key, an encrypted third message based on the third message; and
   transmitting the encrypted third message as part of the conversation session comprising the second set of participants.

3. The system of claim 2, wherein the change in membership indication indicates at least one of:
   a leaving participant that is in the first set of participants but not in the second set of participants; or
   a joining participant that is in the second set of participants but not in the first set of participants.

4. The system of claim 1, wherein the set of operations further comprises:
   accessing the first cryptographic key based on a first association between the first message and the first cryptographic key; and accessing the second cryptographic key based on a second association between the second message and the second cryptographic key.

5. The system of claim 1, wherein the conversation session further comprises a third message for a third set of participants that is encrypted with a third cryptographic key and the third set of participants does not comprise the conversation participant, and wherein the set of operations further comprises:
    determining that the third cryptographic key is inaccessible because the conversation participant is not part of the third set of participants.

6. The system of claim 5, wherein the set of operations further comprises generating an indication that the third message cannot be decrypted because third cryptographic key is inaccessible.

7. The system of claim 1, wherein the conversation participant is associated with a plurality of user accounts, thereby enabling each user account to access the conversation session as the conversation participant.

8. A method for transmitting a message as a moderated conversation participant in a conversation session, the method comprising:
    receiving user input of a first message for the conversation session, wherein the conversation session is among a set of participants, the set of participants comprising:
        a first subset of participants having moderated access to the conversation session; and
        a second subset of participants having unmoderated access to the conversation session;
    generating, using an encryption key, an encrypted first message based on the first message, wherein a first decryption key associated with the encryption key is inaccessible to the first subset of participants having moderated access and is accessible to the second subset participants having unmoderated access;
    transmitting the encrypted first message as part of the conversation session;
    receiving a second message for the conversation session;
    decrypting the second message using a second decryption key to generate a decrypted second message, wherein the second decryption key is accessible to the first subset of participants having moderated access and is not the first decryption key; and
    causing display of the decrypted second message to the first subset of participants.

9. The method of claim 8, wherein the encryption key is a public key of a cryptographic key pair and the first decryption key is a private key of the cryptographic key pair.

10. The method of claim 8, wherein the decrypted second message comprises the first message, thereby indicating the first message is uncloaked for display to the first subset of participants having moderated access to the conversation session.

11. The method of claim 8, further comprising:
    receiving a third message for the conversation session, wherein the third message is associated with the second decryption key;
    decrypting the third message using the second decryption key to generate a decrypted third message; and
    causing display of the decrypted third message.

12. The method of claim 8, further comprising:
    receiving a third message for the conversation session, wherein the third message is associated with the first decryption key that is inaccessible to the first subset of participants having moderated access.

13. The method of claim 12, further comprising:
    based on determining that the first decryption key is inaccessible, providing an indication that the third message cannot be decrypted.

14. A method, comprising:
    accessing, as part of a conversation session among a first set of participants comprising a conversation participant, a first message encrypted with a first cryptographic key;
    decrypting, using the first cryptographic key, the first message to generate a decrypted first message;
    causing display of the decrypted first message to first set of participants who have access to the first cryptographic key;
    receiving a change in membership indication that the conversation session is among a second set of participants, wherein the second set of participants is different than the first set of participants and comprises the conversation participant;
    accessing, as part of the conversation session comprising the second set of participants, a second message encrypted with a second cryptographic key that is different than the first cryptographic key;
    decrypting, using the second cryptographic key, the second message to generate a decrypted second message; and
    causing display of the decrypted second message to the second set of participants who have access to the second cryptographic key.

15. The method of claim 14, further comprising:
    receiving user input of a third message for the conversation session;
    generating, using the second cryptographic key, an encrypted third message based on the third message; and
    transmitting the encrypted third message as part of the conversation session comprising the second set of participants.

16. The method of claim 14, wherein the change in membership indication indicates at least one of:
    a leaving participant that is in the first set of participants but not in the second set of participants; or
    a joining participant that is in the second set of participants but not in the first set of participants.

17. The method of claim 14, further comprising:
    accessing the first cryptographic key based on a first association between the first message and the first cryptographic key; and
    accessing the second cryptographic key based on a second association between the second message and the second cryptographic key.

18. The method of claim 14, wherein the conversation session further comprises a third message for a third set of participants that is encrypted with a third cryptographic key and the third set of participants does not comprise the conversation participant, and wherein the method further comprises:
    determining that the third cryptographic key is inaccessible because the conversation participant is not part of the third set of participants.

19. The method of claim 18, further comprising:
    generating an indication that the third message cannot be decrypted because third cryptographic key is inaccessible.

20. The method of claim 14, wherein the conversation participant is associated with a plurality of user accounts, thereby enabling each user account to access the conversation session as the conversation participant.

\* \* \* \* \*